Figure 1:
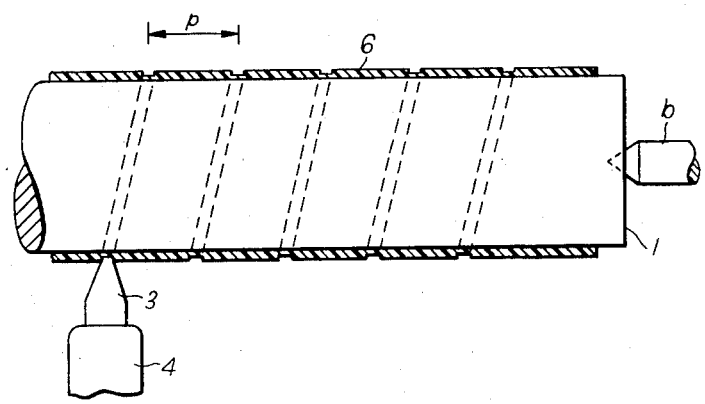

Aug. 3, 1965     F. WALDT     3,197,853

METHOD OF MAKING FLEXIBLE TUBING

Filed May 28, 1962

F. WALDT
Inventor

By Moore & Hall
Attorneys

United States Patent Office 3,197,853
Patented Aug. 3, 1965

3,197,853
METHOD OF MAKING FLEXIBLE TUBING
Felix Waldt, 9 Long-rig, Locks Common, Porthcawl,
Glamorgan, Wales
Filed May 28, 1962, Ser. No. 198,272
2 Claims. (Cl. 29—450)

This invention relates to flexible tubing of the kind in which a sleeve of flexible material is disposed around an inner flexible metal tube formed by helically winding metal strip and having the edges of adjacent turns interlocked so as to permit of relative movement between the convolutions of the tube.

Known tubing of the kind referred to has been made by extruding one of the materials known as plastics over the flexible metallic tube. The outer wall of such a metallic tube has a helical groove which extends along its length. A tube made in this way, with an extruded cover, has a very limited degree of flexibility and extensibility and these qualities are present in the finished tubing to a much smaller extent than they were in the original uncovered flexible metallic tubing. Where a plastic is extruded over a solid-walled grooved metal tube, the comparatively low degree of flexibility of the metal tube is practically lost in the finished tubing.

It is an object of the invention to provide an improved and economic method of making a flexible tubing of the kind referred to which, in addition to possessing the advantages of the known tube, has more nearly the same qualities of flexibility and extensibility as the original inner metallic tube possesses.

It is a further object of the invention to produce economically a flexible tubing of the kind referred to which has an attractive appearance.

According to the invention a method of making a flexible tube of the kind which has a sleeve of flexible material disposed around an inner flexible metal tube formed by helically winding metal strip and having the edges of adjacent turns interlocked so as to permit of limited relative movement between the turns which comprises placing an expanded sleeve having a preformed helically convoluted surface over the flexible metal tube, and allowing the sleeve to contract and grip the metal tube with the grooves of the flexible tube disposed in the grooves of the metal tube.

Further according to the invention a method of making a flexible tube of the kind which has a sleeve of flexible material disposed around an inner flexible metal tube formed by helically winding metal strip and having the edges of adjacent turns interlocked so as to permit of limited relative movement between the turns comprises locally deforming a tube of an elastic plastic by applying heat and pressure to the tube along a helical path so as to produce a permanent shallow deformation of the tube along such path, expanding the tube and causing it to enclose the metal tube and then allowing the tube to contract in such manner that the said spirally deformed part of the tube engages in the helical grooves of the convoluted outer surface of the metal tube.

Figure 2:
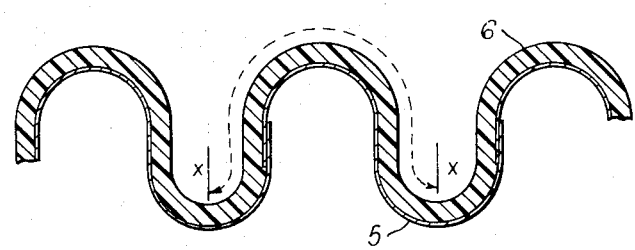

The invention is illustrated by way of example in the accompanying drawings in which FIG. 1 shows, diagrammatically, apparatus including a mandrel having a smooth outer surface for locally deforming a plastic sleeve and FIG. 2 is a fragmentary sectional view of a metal tube which is to be covered by a flexible sleeve.

Referring to the accompanying drawings, in FIG. 1 a mandrel 1 is shown supported in a centre lathe with one centre $b$ shown engaging the mandrel in conventional manner. A tool 3 having a wedge shaped end is carried in a tool rest 4 of the lathe. While the mandrel is rotated, the tool is moved parallel with the axis of the mandrel at a rate determined by a lead screw, not shown, which has a pitch $p$ equal to the linear length of a wave of the helical metal tube 5 shown in FIG. 2 and over which a flexible tube is to be placed. This distance is shown in FIG. 2 by the dotted lines between the points marked $x$—$x$.

The flexible tube which is to be placed over the metal tube is placed on the mandrel so as to grip the latter and is indicated by the reference 6. Either the mandrel 1 or the tool 3 is heated to a temperature of about 90° C. A pressure is exerted by the tool 3 on the sleeve 6 so that, when the mandrel is rotated and the tool is caused to move parallel with the axis of the mandrel a shallow helical depression is formed on the tube 6. This depression is caused by giving the sleeve a set along a helical path. A suitable initial thickness for the sleeve is 25 thousandths of an inch and the depth of the depression may suitably be half this thickness.

A suitable material for the tube is a flexible elastic polyvinyl chloride.

A grooved mandrel having shallow grooves may be employed instead of the smooth mandrel of FIG. 1 to form the permanent set in the plastic tube.

When the elastic tube has been treated as described above it is expanded by introducing air or other gas into the tube which has been closed at one end and the flexible metal tube is then inserted within the plastic tube. When the deformed plastic tube is thus expanded it takes a shape which corresponds to the convoluted shape of the metal tube and in order that the grooves in the plastic tubes should be placed within the groove of the metal tube it is sufficient only to locate manually or otherwise one groove of the plastic tube within a groove of the metal tube and then release the air pressure within the plastic tube. The plastic tube automatically engages the metal tube with the permanently deformed portions of the flexible tube located in the grooves of the metal tube.

The pressure applied by the tool 3 need only be sufficient to cause the strip of material engaged by it to be deformed only very slightly. The rate at which the tool traverses the material will depend on the time necessary for the engaged material to set under the conditions of temperature and pressure which have been selected.

I claim:

1. A method of making a helically grooved flexible tube of the kind which has a sleeve of flexible elastic material disposed around an inner flexible helically grooved metal tube of the type formed by helically winding metal strip and having the marginal portions of adjacent turns overlapping each other so as to permit limited relative movement between said portions, said method comprising the steps of forming a tube of said flexible elastic material, forming on said elastic tube helically extending portions which are relatively inelastic compared to the rest of said elastic tube, expanding said elastic tube and placing the expanded elastic tube over the metal tube and allowing the expanded elastic tube to contract and grip the metal tube with the relatively inelastic portions of the elastic tube disposed in the grooves of the outer surface of the metal tube, said helically extending portions being formed in said elastic tube with a pitch length substantially equalling the pitch length of a turn of said metal tube.

2. A method of making a helically grooved flexible tube of the kind which has a sleeve of flexible elastic material disposed around an inner flexible helically grooved metal tube of the type formed by helically winding metal strip and having the marginal portions of adjacent turns overlapping each other so as to permit limited relative movement between said portions, said method comprising the steps of locally deforming a tube of an elastic plastic to form helically extending portions which are relatively inelastic compared to the rest of said elastic tube by applying heat and pressure to the tube along a helically extending path having a pitch length substantially equalling the pitch length of one of said turns of said metal tube, expanding the elastic tube and placing the expanded elastic tube over the metal tube, allowing said expanded elastic tube to contract onto said metal tube when it is so positioned relative to the metal tube that the said helically deformed inelastic part of the elastic tube engages in the helical grooves of the convoluted outer surfaces of the metal tube.

References Cited by the Examiner

UNITED STATES PATENTS

| | | | |
|---|---|---|---|
| 839,380 | 12/06 | Greenfield | 138—122 |
| 1,978,529 | 10/34 | Harrah | 138—122 X |
| 2,187,347 | 1/40 | Guarnaschelli | 138—122 |
| 2,728,356 | 12/55 | Brinsmade et al. | 138—121 |
| 2,914,845 | 12/59 | Crites | 29—450 |
| 2,941,571 | 6/60 | Rothermel | 138—122 X |
| 2,956,305 | 10/60 | Raydt et al. | 18—59 X |
| 3,015,133 | 1/62 | Nichols | 138—139 X |
| 3,049,801 | 8/62 | Workman | 29—450 |

FOREIGN PATENTS

| | | |
|---|---|---|
| 315,014 | 8/56 | Switzerland. |
| 599,600 | 6/60 | Canada. |
| 691,076 | 7/30 | France. |

WHITMORE A. WILTZ, *Primary Examiner.*

EDWARD V. BENHAM, LEWIS J. LENNY, *Examiners.*